UNITED STATES PATENT OFFICE.

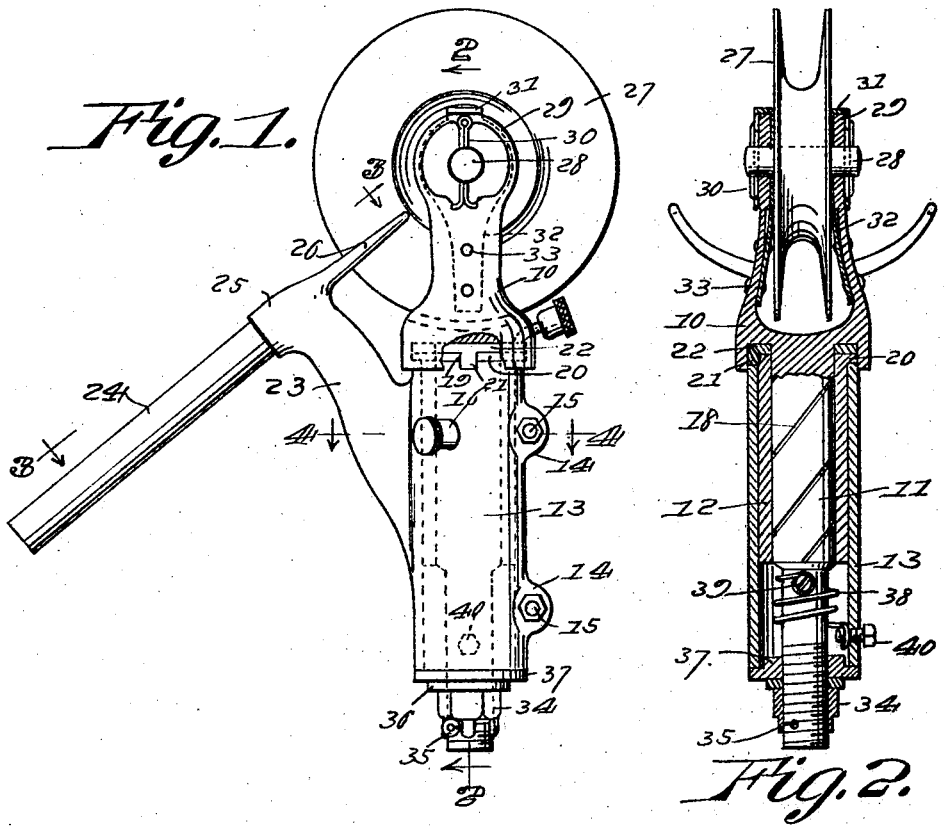

CHARLES W. OLDENQUIST, OF WEST LYNN, MASSACHUSETTS.

TROLLEY HARP.

1,414,301. Specification of Letters Patent. Patented Apr. 25, 1922.

Application filed September 29, 1919. Serial No. 327,211.

*To all whom it may concern:*

Be it known that CHARLES W. OLDENQUIST, a citizen of the United States of America, residing at West Lynn, in the county of Essex and State of Massachusetts, has invented new and useful Improvements in Trolley Harps, of which the following is a specification.

The object of the invention is to provide an improved construction of trolley harp adapted to be used in connection with the ordinary and well-known forms of trolley wheels or rollers and provided with means whereby compensation may be made for wear while reducing the latter to the minimum by providing efficient means for applying a lubricant to the surfaces of the operating parts, to the end that the maximum of efficiency and durability in a device of this type may be attained; and with these objects in view the invention consists in a construction and combination of parts in which a preferred embodiment is shown in the drawing, it being understood that changes in form and proportion may be resorted to within the scope of the claims without departing from the principles involved.

In the drawing:

Figure 1 is a side view of the apparatus.

Figure 2 is a vertical sectional view on the plane indicated by the line 2—2 of Figure 1.

Figure 3 is a plan view of the trolley guard and the adjacent portion of the pole as indicated by the dotted line 3—3 of Figure 1.

Figure 4 is a transverse section on the plane indicated by the line 4—4 of Figure 1.

Figure 5 is a detail view of the upper portion of the bushing in which the stem of the harp is mounted.

Figure 6 is a detail view of the washer which is interposed between the head and the upper end of the sleeve.

The head 10 of the trolley harp is provided with a stem 11 which extends through a split bushing 12 fitted in a diametrically adjustable sleeve 13 adapted to be contracted to correspondingly contract or collapse the bushing to take up lost motion between the inner surface of the latter and the stem or spindle 11. To this end the sleeve is provided with ears 14 connected in pairs by transverse adjacent bolts 15, and in order that a proper lubrication of the surfaces of the stem or spindle and the bushing may be secured an oil or grease cup 16 is employed to discharge through an oil passage 17 in the bushing while the surface of the stem or spindle is provided with distributing grooves 18. The bushing is held from rotary movement in the sleeve by means of a notch formed in the upper edge of the latter and a notch 19 formed in the flange 20 which rests upon the upper edge of the sleeve, both notches being engaged by a tongue 21 depending from a phosphor bronze washer 22 which in turn is seated upon the upper end of the bushing and forms the thrust bearing for the trolley head 10.

Formed rigidly, and if preferred integral with the sleeve 13 is a bracket 23 to which is attached the pole 24, said bracket having the usual socket 25 for the reception of the upper end of the pole, and also carried by said bracket is the forked guard 26 which is adapted to engage the trolley wire in the event of the disengagement of the trolley wheel 27 therefrom. The spindle 28 of the trolley wheel which may be of the ordinary or any preferred construction is mounted in suitable bearings in the arms 29 of the trolley harp where it is held by means of split keys 30 or the equivalent thereof, a contact washer 31 being employed as in the usual practice at the upper ends of said arms, and contact springs 32 being secured by rivets 33 to the inner surfaces of the arms for contact with the sides of the trolley wheel.

While, as will be seen, the trolley wheel is adapted to turn upon its stem or spindle 11 to follow the course of the trolley wire, the lower end of said stem or spindle being engaged by a nut 34 locked by a key 35 and bearing against a washer 36 which in turn is in contact with the disk 37 at the lower end of the sleeve 13, said stem or spindle is yieldingly held in its normal position by means of a spring 38 secured at one end as by a screw 39 to the stem and at the other end as by a set screw 40 to the sleeve. The tension of the spring may be adjusted, or its position relative to the sleeve may be modified by means of the set screw, to insure holding the trolley wheel in the proper position with relation to the plane of the trolley pole, and at the same time the spring is readily detachable by loosening said set screw and upon removing the nut 34 the stem or spindle may be removed from the sleeve and bearing elements for repair, cleaning and the like. As a means of lubricating the bearing washer 22 an oil or grease cup 41 may be employed.

It will be readily understood that whereas by the means provided the wear upon the parts due to the turning of the head as the trolley wheel follows the wire is reduced to the minimum, any tendency to lost motion due to the wearing of the surfaces of the stem or spindle and bushing may readily be compensated for by contracting the bushing through the diametrical reduction of the sleeve 13 through the adjustment of the bolts 15.

What is claimed is:

1. The combination with a spindle designed for turning movement, of a split sleeve, a split bushing fitted in the sleeve and provided at its upper end with a flange overhanging the upper edge of the sleeve, a washer mounted upon and keyed to the upper end of the bushing and forming a thrust bearing for a shoulder formed on the spindle, and means for contracting the sleeve to diametrically reduce said bushing.

2. The combination with a spindle designed for turning movement, of a sleeve in surrounding relation to the spindle, a bushing fitted in the sleeve and interposed between it and the spindle, a spring yieldingly holding the spindle against angular or turning movement and being secured at one end to the spindle, and adjustable means for securing the other end of said spring to the sleeve.

In testimony whereof he affixes his signature.

CHARLES W. OLDENQUIST.